(12) United States Patent
Holt et al.

(10) Patent No.: US 7,971,910 B2
(45) Date of Patent: Jul. 5, 2011

(54) CONDUIT TO COMPONENT FITTING HAVING A LEAK DETECTION MECHANISM

(75) Inventors: Matthew Holt, Dearborn Heights, MI (US); Lisa A. S. Holt, legal representative, Livonia, MI (US); Fred Butler, Clarkston, MI (US); John W. Wilds, Sr., Troy, MI (US); Steven Lenhart, Dearborn, MI (US)

(73) Assignee: Ford Motor Company, Dearborn, MI (US)

( * ) Notice: Subject to any disclaimer, the term of this patent is extended or adjusted under 35 U.S.C. 154(b) by 862 days.

(21) Appl. No.: 11/565,104

(22) Filed: Nov. 30, 2006

(65) Prior Publication Data
US 2008/0129043 A1 Jun. 5, 2008

(51) Int. Cl.
*F16L 35/00* (2006.01)
(52) U.S. Cl. .............................. 285/93; 285/13; 285/208
(58) Field of Classification Search .................... 285/13, 285/14, 93, 206, 208, 207
See application file for complete search history.

(56) References Cited

U.S. PATENT DOCUMENTS

| 1,967,297 A | * | 7/1934 | Down | 285/14 |
| 3,666,237 A | | 5/1972 | Piccardo | |
| 4,473,244 A | * | 9/1984 | Hill | 285/14 |
| 4,875,709 A | * | 10/1989 | Caroll et al. | 285/14 |
| 5,467,611 A | | 11/1995 | Cummings et al. | |
| 5,713,607 A | | 2/1998 | Webb | |
| 5,831,149 A | * | 11/1998 | Webb | 285/13 |
| 6,027,144 A | * | 2/2000 | Hagen et al. | 285/93 |
| 6,561,433 B2 | | 5/2003 | Sudo et al. | |
| 6,679,319 B1 | | 1/2004 | Kato | |
| 6,726,256 B2 | * | 4/2004 | Viegener | 285/13 |
| 7,150,473 B2 | * | 12/2006 | Sandborn et al. | 285/14 |

* cited by examiner

*Primary Examiner* — David E Bochna
(74) *Attorney, Agent, or Firm* — Tung & Associates; Raymond L. Coppiellie

(57) ABSTRACT

A leak detection mechanism for use with a pressurized system that relates generally to an assembly for connecting a conduit to a component. The mechanism utilizes a fluid passageway for detecting a leak or absence of a seal after connecting a conduit to a component such as an expansion valve of a pressurized fluid system. The fluid passageway forms a predetermined leak path enabling fluid flow into or out of the system when an o-ring or other seal means is missing.

9 Claims, 3 Drawing Sheets

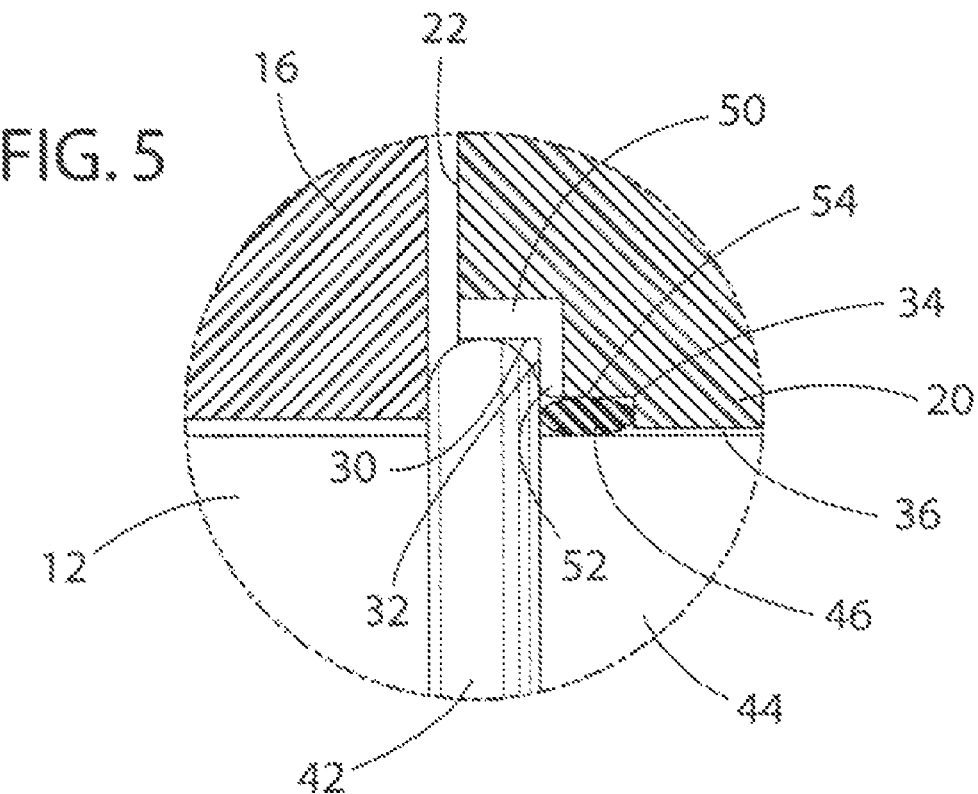
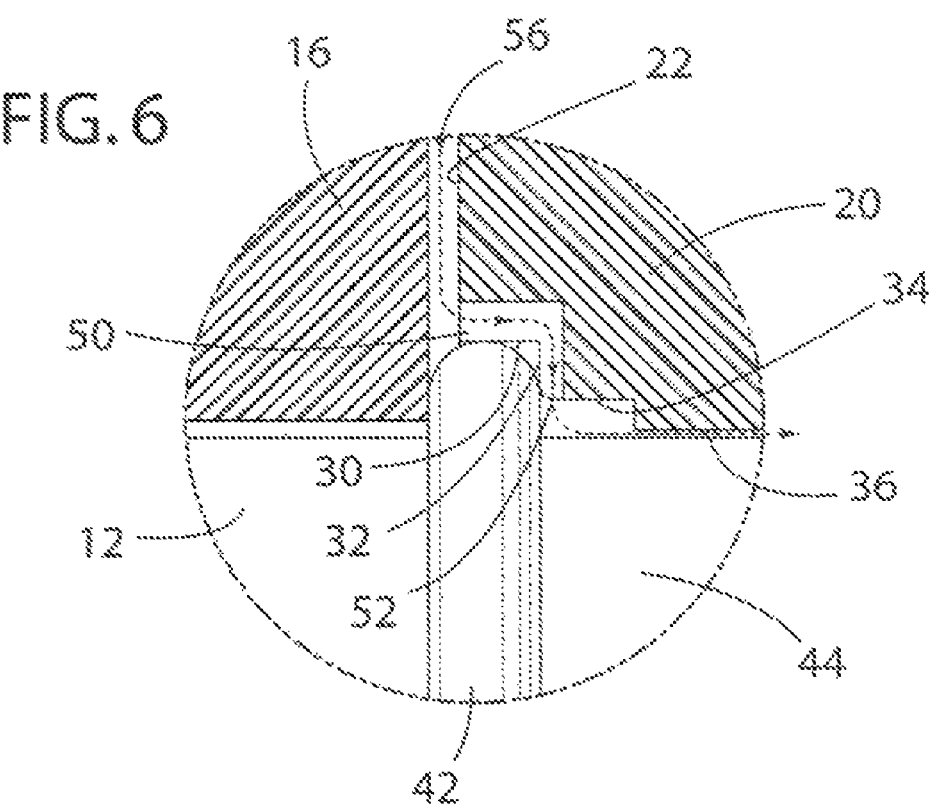

CONDUIT TO COMPONENT FITTING HAVING A LEAK DETECTION MECHANISM

CROSS-REFERENCE TO RELATED APPLICATIONS

Not applicable.

BACKGROUND OF THE INVENTION

1. Field of the Invention

The present invention relates generally to an assembly for connecting conduit to a component. More specifically, this invention relates to a mechanism for detecting a leak or absence of a seal after connecting a conduit to a component, such as a connection block or an expansion valve, of a pressurized fluid system.

2. Description of Related Art

Modern automotive air conditioning systems generally include a compressor, condenser, evaporator, expansion valve and a plurality of conduits or lines that connect the various components. A suitable refrigerant is contained within the system. Installation of the various air conditioning system components is typically independent of one another with the conduit connected to the components after they are installed or mounted to the vehicle. While different methods and apparatuses for securing the conduit to the various components are known, one method utilizes an o-ring encircling an end of conduit that provides a seal when the end of the conduit is secured in a port on the component.

To secure the end of the conduit to the component, a connection plate engages and traps the conduit in a conduit passage extending through the plate. The connection plate further includes a second passageway offset from and parallel to the conduit passage. Once the conduit is inserted into a port on the component, a fastener extending through the second passageway secures the connection plate to the component whereby the end of the conduit is connected to the component.

Vehicle space limitations and packaging consideration sometimes make it difficult for an assembler to attach the conduit to the various components due to their location on the vehicle. In addition, mass production constraints, wherein the vehicles are traveling rapidly on an assembly, limit the time provided to connect the conduit to the various components. Thus, during or prior to the assembly process and unbeknownst to the assembler, the o-ring may be damaged or missing from the end of the conduit. Accordingly, the conduit may be installed to the component with a damaged o-ring or without the o-ring.

To insure the system is properly assembled, the system undergoes a leak test prior to filling the system. The leak test typically involves the use of a vacuum leak testing system that draws a vacuum on the system and monitors the level and hold time of the vacuum. Accordingly, an air conditioning system may ultimately pass the leak test even though the o-ring is damaged or missing. For example, in some instances the connection plate provides sufficient pressure on an annular bead or upset portion of the conduit to compress it against the component thereby forming a temporary or limited seal. Such a seal results in a slow leak. The leak detection system may not detect such slow leaks resulting in the system passing the leak test and being filled with refrigerant. Over time, the refrigerant leaks out and the system ceases to work, resulting in warranty concerns along with expensive and time-consuming repairs.

Accordingly, it is desirable to provide a conduit to component fitting assembly having a leak detection mechanism that cooperates with the leak detection system to detect a missing or damaged seal member upon or at the initial leak detection step and prior to filling the system with refrigerant.

SUMMARY OF THE INVENTION

The present invention is a leak detection mechanism for use with a pressurized system, such as an air conditioning system. In particular, the present invention provides a mechanism for detecting a leak between a component and a conduit connected to the component. The component has an outer surface. A port having an inner surface and a seal surface extends inward into the component. A fluid passageway extends from the outer surface of the component to a position spaced from the seal surface. In an embodiment thereof, the fluid passageway includes a slot located in an inner surface of the port.

In a further embodiment, the conduit includes an end, an upset and an o-ring located on the conduit between the end and the upset. The conduit is placed in the port such that the o-ring engages the seal surface of the port and the upset contacts the component. The fluid passageway extends from the outer surface to the port and forms an opening in the port with the opening located between the seal surface and the upset.

In accordance with the present invention, the fluid passageway provides fluid communication between the port and the outer surface and bypasses any temporary or limited seal formed between the upset and the component. Thus, the fluid passageway forms a leak path if the o-ring is not present. The present invention leaves the o-ring seat or seal surface undisturbed whereby the o-ring seals the conduit/component interface when the o-ring is present.

BRIEF DESCRIPTION OF THE DRAWINGS

FIG. 5 is an enlarged cross-section of circle 5 of FIG. 4.

FIG. 6 is the enlarged cross-section of circle 5 with the o-ring removed.

DETAILED DESCRIPTION OF THE PREFERRED EMBODIMENTS

Figure 1:
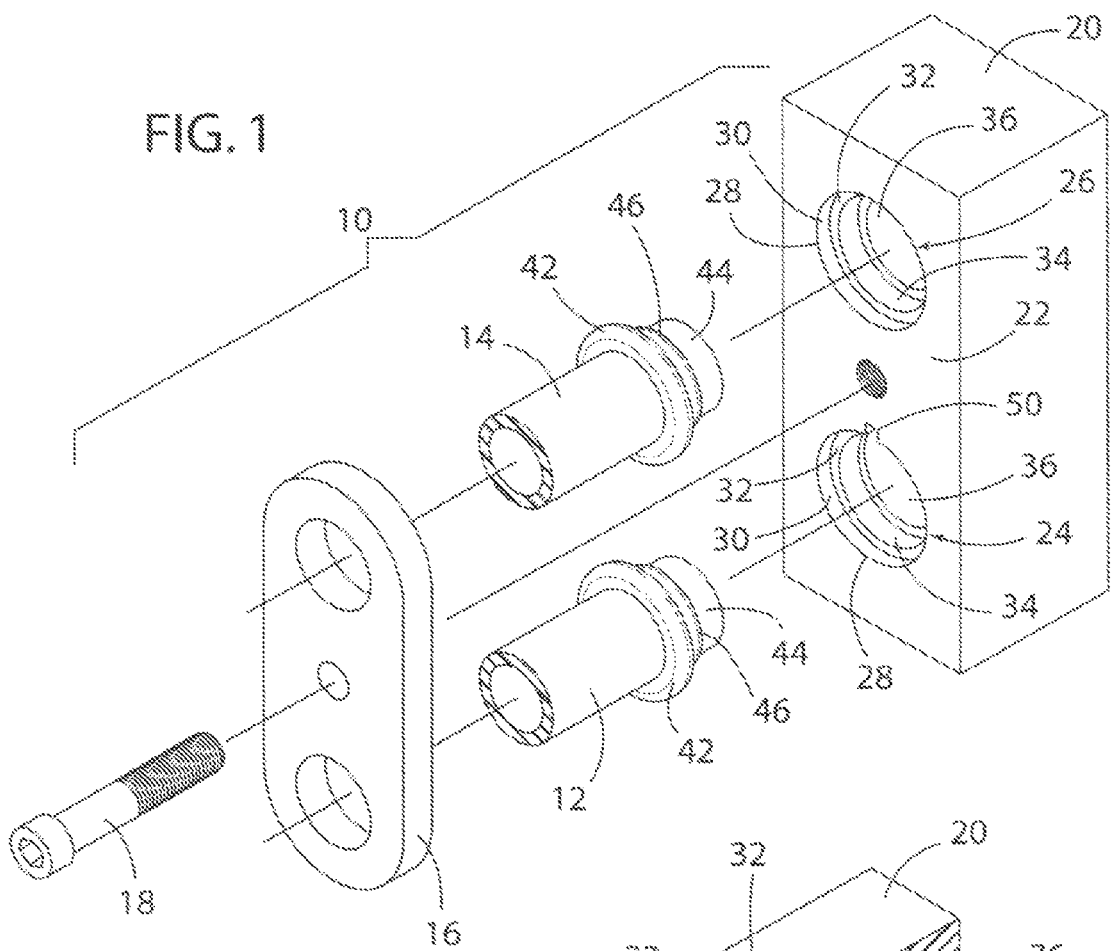
FIG. 1 is an exploded perspective view of a conduit to component fitting having a leak detection mechanism according to the present invention.
Figure 2:
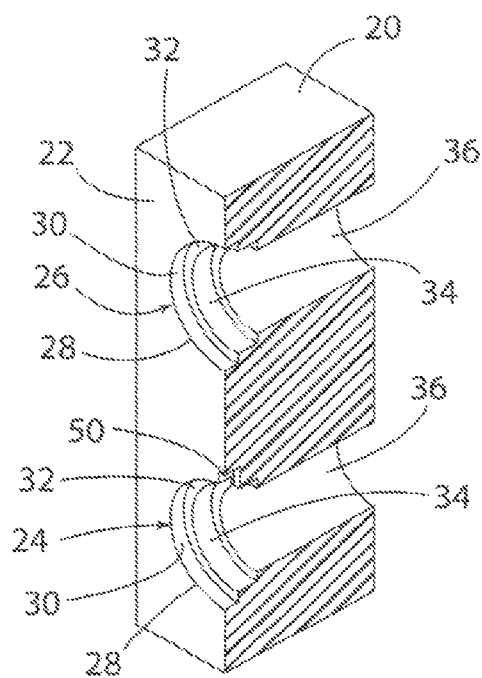
FIG. 2 is a perspective sectional view of the component alone.
Figure 3:
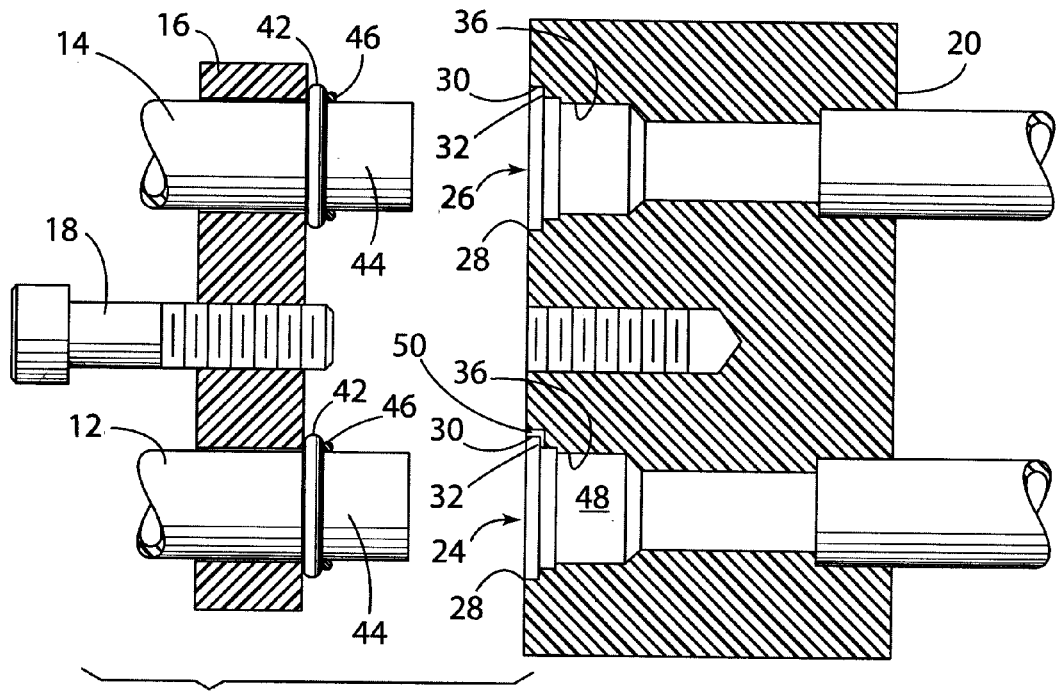
FIG. 3 is a side view of the conduit and connection plate spaced from the component and in the process of being attached.

Referring now to FIG. 1, an embodiment of the leak detection mechanism, seen generally at 10 according to the present invention is shown. The mechanism 10 includes a high-pressure line or inlet conduit 12 and a suction line or outlet conduit 14, a connector plate 16, threaded fastener 18 and an air conditioning (A/C) system component 20, such as an expansion valve. The inlet conduit 12 and outlet conduit 14 are connected to the component 20 and correspondingly provide a supply and return line for a pressurized fluid, such as a refrigerant used in the A/C system.

The component 20 has an outer surface 22. The outer surface 22 contains an inlet port 24 and an outlet port 26 through which the pressurized fluid flows as it travels into and out of the component 20. Both the inlet port 24 and outlet port 26 include a counterbore 28 formed of a first annular surface 30 and an axial surface 32. The inlet and outlet ports 24, 26 further include a second annular surface 34 and a third annular surface 36 that extends into the component 20 from the second annular surface 34. Each of the ports 24, 26 connect with the respective bores, 38, 40 whereby fluid flows through the component 20.

Figure 4:
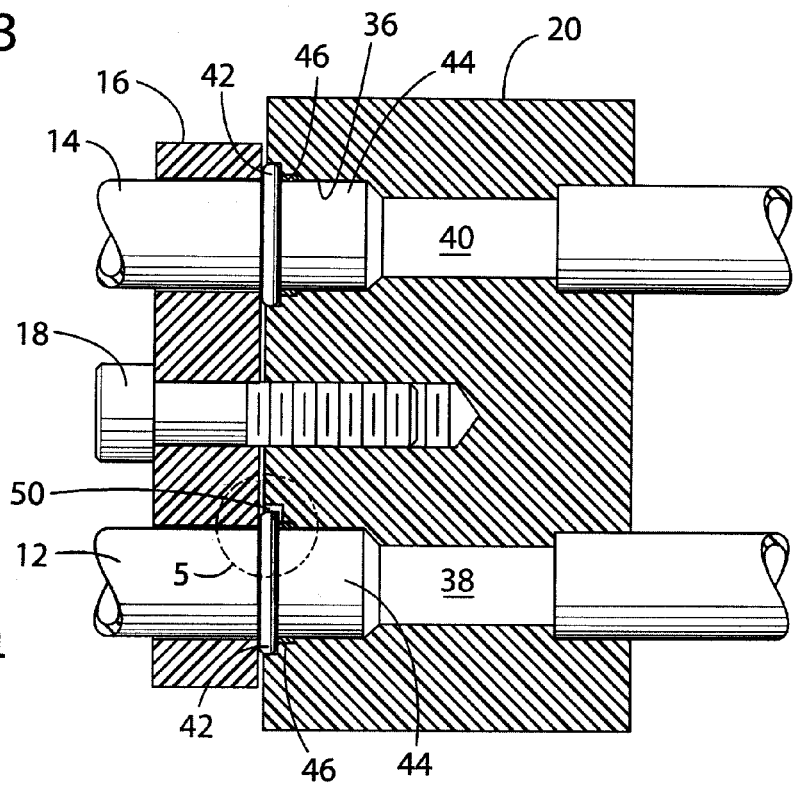
FIG. 4 is a side view of the conduit and connection plate attached to the component.

The inlet conduit 12 and outlet conduit 14 each include an upset 42 and an end 44. A seal member, such as an o-ring 46, is located on the respective ends 44 of the inlet conduit and outlet conduits 12, 14 adjacent to the upset 42. To connect the inlet and outlet conduits 12, 14 to the component 20, the ends 44 of the inlet conduit 12 and outlet conduit 14 are slidably inserted into the respective inlet port 24 and outlet port 26 such that the ends 44 of the inlet and outlet conduits 12, 14 engage the third annular surfaces 36 of each of the inlet and outlet ports 24, 26. The upsets 42 engage the counterbores 28 on each of the inlet and outlet ports 24, 26 and limit travel of the inlet and outlet conduits 12, 14. As illustrated in FIG. 4 the o-rings 46 located on the ends 44 of the conduits 12, 14 create an annular seal by engaging the second annular surfaces 34. As known in the art, the connector plate 16 and threaded fastener 18 provide a compressive force on the upset 42 to hold the respective inlet and outlet conduits 12, 14 in position on the component 20.

Referring now to the inlet conduit 12 and corresponding inlet port 24, as the conduit 12 is inserted into the port 24 the end of the conduit 12 enters the passageway or bore 48 defined by the third annular surface 36. The end of the conduit 12 continues to travel within the bore 48 until the upset 42 is located in the counterbore 28 formed by the first annular surface 30 and the axial surface 32. The second annular surface 34 includes a seal surface 54 that cooperates with the o-ring 46 located on the end 44 of the conduit 12 to form an annular seal and prevent leakage at the conduit 12 and port 24 interface. As illustrated in FIGS. 5-6, the port 24 includes a passageway shown as a slot 50 extending radially outward from the first annular surface 30. The slot 50 extends along the inner surface of the port 24 from the outer surface 22 of the component 20 to the second annular surface 34 and creates an opening 52 in the second annular surface 34.

The slot 50 and correspondingly the opening 52 in the second annular surface 34 does not interfere with the sealing capability of the o-ring 46, since the opening 52 formed in the second annular surface 34 is located between the o-ring 46 and the upset 42. As illustrated in FIG. 5, seal surface 54, that is the area or surface of the second annular surface 34 contacted by the o-ring 46, is spaced from the opening 52 located in the second annular surface 34. Accordingly, the o-ring 46 contacts the seal surface 54 and prevents any pressurized fluid from passing through the slot 50.

In those cases where the o-ring 46 is missing or improperly installed, a temporary or limited seal can be created when the conduit 12 is connected to the component 20. The temporary or limited seal results from the upset 42 engaging the first annular surface 30, the axial surface 32 or both. For example, depending upon tolerances tightening the fastener 18 and corresponding connection plate 16 compresses the upset 42 against one of the surfaces of the counterbore 28 and creates a temporary or limited seal. Prior to filling the system with refrigerant, a leak test, that includes drawing a vacuum on the system, is conducted. The temporary or limited seal is often sufficient to result in the A/C system passing the leak test. Accordingly, the A/C system is filled with refrigerant, which over time leaks out causing repair and warranty concerns.

As illustrated in FIG. 6, the slot 50 provides a predetermined leak path, illustrated by the arrow 56. Accordingly, when the o-ring 46 is missing, the leak testing equipment cannot draw a vacuum as it draws air through the slot 50 into the A/C system during the leak test. Since drawing air through the slot 50 prevents drawing a vacuum the slot 50 provides a mechanism whereby the A/C system does not past the leak test if the o-ring 46 is missing. Accordingly, the present invention provides a leak detection mechanism, in the form of a passageway or slot 50 extending between the seal surface 54, that portion of the second annular surface 34 contacted by the o-ring 46, and the outer surface 22 of the component 20. The passageway or slot 50 is only open or communicates with the interior of the A/C system when the seal element or o-ring 46 is missing. As disclosed, the opening 52 in the second annular surface 34 created by of the passageway or slot 50 is located between the seal surface 54 and the upset 42 on the conduit 12.

While illustrated herein as a slot 50, the passageway can take several forms including a bore, aperture or other opening that extends between the second annular surface 34 and the outer surface 22 of the component 20. It should be understood that the slot 50 forms a predetermined leak path that circumvents any seal formed between the upset 42 and the inlet port 24. Further, while the slot 50 is shown only used with the inlet port 24, that is for illustrative purposes only, a slot 50 may also be used with the outlet port 26.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A leak detection mechanism for use with a pressurized system comprising:
   a component, said component having an outer surface, and a port, said port communicating with said outer surface; said port having a seal surface;
   said component further having a fluid passageway extending between said outer surface and said port, said passageway forming an opening in said port, said opening located between said seal surface and said outer surface;
   said port including a first annular surface, a second annular surface and an axial surface located between said first and said second annular surfaces; and
   said fluid passageway including a slot in said first annular surface, said slot disposed in said first annular surface and said axial surface and extending to said second annular surface wherein said second annular surface includes said seal surface, and said slot forming an opening in said second annular surface whereby said slot forms a fluid path between a portion of said second annular surface and said outer surface.

2. A leak detection mechanism for use with a pressurized system as set forth in claim 1 wherein said first annular surface has a diameter greater than a diameter of said second annular surface, such that said slot extends axially along said first annular surface and radially along said axial surface.

3. A leak detection mechanism for use with a pressurized system comprising:
   a component, said component having an outer surface and a port, said port communicating with said outer surface; said port having a seal surface;
   a conduit, said conduit having an end and an upset spaced from said end, said end located in said port and said upset contacting said component;

a passageway extending from said outer surface to said port and forming an opening in said port, said opening located between said seal surface and said upset and forming a flow path around said upset when said upset contacts said component; and a seal member, said seal member engaging said end of said conduit and said seal surface to prevent fluid flow through said passageway whereby the absence of said seal member enables fluid flow through said passageway.

4. A leak detection mechanism for use with a pressurized system as set forth in claim 3 wherein said passageway includes a slot formed in a sidewall of said port.

5. A leak detection mechanism for use with a pressurized system comprising:

a component, said component having an outer surface and a port, said port communicating with said outer surface;

said port having a seal surface;

a conduit, said conduit having an end and an upset spaced from said end, said end located in said port and said upset contacting said component;

a passageway extending from said outer surface to said port and forming an opening in said port, said opening located between said seal surface and said upset and forming a flow path around said upset when said upset contacts said component;

said port having a first annular surface, a second annular surface and an axial surface located between said first and said second annular surfaces wherein said second annular surface includes said seal surface with said opening located in said second annular surface between said seal surface and said axial surface; and said upset contacting at least one of said first annular surface and said axial surface.

6. A leak detection mechanism for use with a pressurized system as set forth in claim 5 including:

said port having a first annular surface, a second annular surface and an axial surface located between said first and said second annular surfaces wherein said second annular surface includes said seal surface;

said first annular surface and said axial surface forming a counterbore; and said upset located in said counterbore and contacting at least one of said first annular surface and said axial surface.

7. A leak detection mechanism for use with a pressurized system as set forth in claim 6 wherein said counterbore has a diameter greater than a diameter of said second annular surface and said passageway includes a slot formed in said first annular surface and said axial surface wherein said slot extends from said outer surface to said second annular surface to create said opening in said port.

8. A leak detection mechanism for use with a pressurized system comprising:

a component, said component having an outer surface, a fluid flow path and a port, said port communicating with said outer surface;

said port having a first annular surface adjacent said outer surface, a second annular surface and an axial surface extending between said first and said second annular surfaces, said first annular surface and said axial surface forming a counterbore with said second annular surface positioned between said fluid flow path and said counterbore;

a conduit, said conduit having an end and an upset spaced from said end, said end located in said port and said upset located in said counterbore;

said second annular surface having a seal surface located between said axial surface and said fluid flow path; and a passageway extending from said outer surface to said second annular surface, said passageway forming an opening on said second annular surface, said opening located on said second annular surface between said seal surface and said axial surface, whereby said passageway forms a flow path around said upset when said upset is located in said counter bore.

9. A leak detection mechanism for use with a pressurized system as set forth in claim 8 wherein said passageway includes a slot formed in said first annular surface and said axial surface wherein said slot extends from said outer surface to said second annular surface.

* * * * *